United States Patent [19]

Bales

[11] Patent Number: 5,533,096
[45] Date of Patent: Jul. 2, 1996

[54] SEND-ALL-CALLS FEATURE FOR A WIRELESS HANDSET

[75] Inventor: Bruce M. Bales, Louisville, Colo.

[73] Assignee: AT&T Corp., Murray Hill, N.J.

[21] Appl. No.: 371,936

[22] Filed: Jan. 11, 1995

Related U.S. Application Data

[63] Continuation of Ser. No. 76,564, Jun. 14, 1993, abandoned.

[51] Int. Cl.[6] .............................. H04Q 7/38; H04M 3/54
[52] U.S. Cl. ........................... 379/58; 379/142; 379/210; 379/214
[58] Field of Search ........................... 379/58, 59, 67, 379/88, 89, 142, 210, 211, 212, 214, 57, 202, 204, 206; 455/33.1, 53.1, 54.1

[56] References Cited

U.S. PATENT DOCUMENTS

| | | | |
|---|---|---|---|
| 4,266,098 | 5/1981 | Novak | 179/84 C |
| 4,941,203 | 6/1990 | Patsiokas et al. | 455/53.1 |
| 5,023,868 | 6/1991 | Davidson et al. | 379/211 X |
| 5,109,405 | 4/1992 | Morganstein | 379/214 |
| 5,276,729 | 1/1994 | Higuchi et al. | 379/58 |
| 5,327,486 | 7/1994 | Wolff et al. | 379/210 X |
| 5,369,694 | 11/1994 | Bales et al. | 379/206 X |
| 5,414,750 | 5/1995 | Bhagat et al. | 379/57 |
| 5,428,663 | 6/1995 | Grimes et al. | 379/58 X |

FOREIGN PATENT DOCUMENTS 2193861   2/1988   United Kingdom ............... 379/61

Primary Examiner—Curtis Kuntz
Assistant Examiner—William G. Trost
Attorney, Agent, or Firm—John C. Moran

[57] ABSTRACT

A telephone terminal for implementing a send-all-calls feature by immediately transferring all incoming calls to call coverage but maintaining ongoing call control of calls from selected individuals. The telephone terminal maybe a wireless mobile unit. In response to calls from the selected individuals, the wireless mobile unit displays the name or number of the individual calling but still immediately transfers those calls to call coverage. The user of the wireless mobile unit can answer the call from a selected individual after the call has been transferred to call coverage. The user of the wireless mobile unit designates the selected callers by either manually entering names or telephone numbers of these individuals via the keyboard of the wireless mobile unit or by transferring the names or numbers to the wireless mobile unit from a computer.

12 Claims, 4 Drawing Sheets

MESSAGE FLOW

BASE STATION 108

SEND-ALL-CALLS FEATURE FOR A WIRELESS HANDSET

This application is continuation of application Ser. No. 08/076,564, filed on Jun. 14, 1993.

TECHNICAL FIELD

This invention relates to telecommunication switching systems and, in particular, to providing a send-all-calls feature for a wireless handset.

BACKGROUND OF THE INVENTION

In prior art telecommunication switching systems providing wireless service for wireless mobile units (also referred to as cellular telephones), the wireless mobile units allowed a user the capability of being able to place and receive calls at any time from any location. However, there are many situations where the user does not want the wireless handset to ring on an incoming call or to receive a visual indication of an incoming call. Examples of such situations are restaurants and meetings. Whereas, the user may not want the wireless mobile unit to ring or give a visual indication for many incoming calls, the user does want to know when selected people are calling by displaying those peoples names on the wireless mobile unit. Further, the user of the wireless mobile unit wants to retain the ability to talk to a calling party whose name is being displayed on the wireless mobile unit. Similar problems are experienced with wired telephone station sets.

As described in U.S. Pat. No. 5,070,525, telephone companies in the United States have offered a feature called call blocking for individual telephone subscribers. The call blocking feature allows a telephone subscriber to key in telephone numbers from which the subscriber does not wish to receive telephone calls. Telephone subscribers utilize this feature principally to block calls from a telemarketing service or collection agency. Of necessity, this feature allows a limited number of telephone numbers to be designated as being blocked. Hence, the feature cannot be used to allow only small selected groups of individuals to call a telephone subscriber.

U.S. Pat. No. 4,723,273, discloses a system which allows a telephone user while talking on a first telephone call to forward a second telephone call to call coverage by activation of a send call button. The telephone user can subsequently retrieve the second call at any time by actuation of a call retrieval button on the user's telephone set. The telephone user is required to manually forward each telephone call by actuation of the send call button, and if the user wishes to retrieve the call, the user must actuate the call retrieval button. Whereas, the system disclosed in U.S. Pat. No. 4,723,273, allows a user of a wireless mobile unit the capability of performing call forwarding on calls being received, the system still requires the user to perform a physical act for each received call.

Also known in prior art systems, is the send-all-calls feature. This feature allows a user of a telephone set to designate that all calls directed towards that telephone set should be transferred to call coverage. This feature does not allow the user to specify certain callers which will not be transferred; nor, does the feature allow the user the opportunity to retrieve a call once that call has been transferred to call coverage. U.S. Pat. No. 4,436,963 describes the send-all-calls feature.

SUMMARY OF THE INVENTION

The foregoing problems are solved, and a technical advance is achieved by a telephone terminal in which the send-all-calls feature immediately transfers all incoming calls to call coverage. In response to calls from selected individuals, the telephone terminal displays the name or number of the individual calling but still immediately transfers those calls to call coverage. The user of the telephone terminal can answer the call from a selected individual after the call has been transferred to call coverage. The user of the telephone terminal designates the selected callers by either manually entering names or telephone numbers of these individuals via the keyboard of the telephone terminal or by transferring the names or numbers to the telephone terminal from a computer. Advantageously, the telephone terminal maybe a wireless mobile unit.

Advantageously, with respect to an incoming call that is from a selected individual, the wireless mobile unit maintains control of the call after it has been transferred to the call coverage system. The wireless mobile unit does this by receiving all control information exchanged between the calling telephone and the call coverage system. Since all of the control information flows through the mobile wireless unit, the latter unit can at any time terminate the call coverage system from the call or bridge itself onto the call. Further, since the wireless mobile unit is performing all necessary control functions, the telecommunications system utilized to transport the call is required to have only the basic control functions. This allows the feature to be implemented on any telecommunications system having these basic functions without requiring that new functions be added in order to support the send-all-calls feature.

Other and further aspects of the present invention will become apparent during the course of the following description and by the reference to the accompanying drawing.

DETAILED DESCRIPTION

Figure 1:
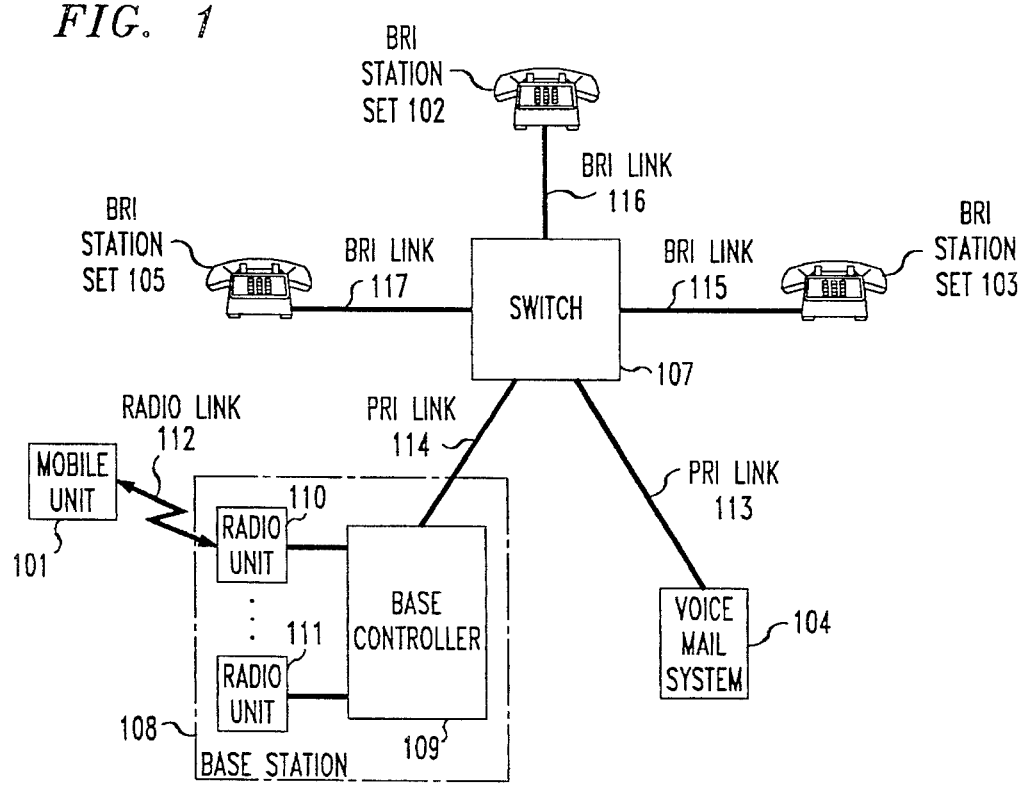
FIG. 1 illustrates, in block diagram form, a telecommunications switching system embodying the inventive concept.

FIG. 1 shows a telecommunication switching system having a switching node 107 which provides telecommunication between BRI station sets 115, 116, and 117. In addition, the telecommunication system provides wireless service to mobile units such as mobile unit 101 via base station 108. Also, call coverage is provided by voice mail system 104. The switching functions performed by switch 107 are described in U.S. Pat. Application of B. M. Bales, et al. "Automatic Initialization of a Distributed Telecommunication Systems", Ser. No. 07/816,360, filed on Dec. 30, 1991, assigned to the same assignee as the present application, and hereby incorporated by reference.

In general terms, consider the operations performed by the telecommunication system illustrated in FIG. 1 to implement the present invention. To explain these operations consider the following example. Before activating the send-all-calls feature on mobile unit 101, the user must have entered the telephone numbers of the selected individuals whose name will be displayed on the display unit of mobile unit 101 if they call. For this example, the user of station set 102 is one of the selected individuals; whereas, the user of BRI station set 105 is not. Further, the example assumes that BRI station set 103 is providing call coverage for mobile unit 101. The user of BRI station set 105 is not one of the selected individuals. If a call is placed from BRI station set 105 to mobile unit 101, after mobile unit 101 has activated the send-all-calls function, mobile unit 101 immediately transfers that call to BRI station set 103. Further, mobile unit 101 retains no control over the call after transferring it to call coverage. The manner in which mobile unit 101 transfers the call to call coverage is described in the U.S. Pat. Application of B. M. Bales, et al. "Redirection of Calls by a Communication Terminal", Ser. No. 07/816,363, filed on Dec. 30, 1991, assigned to the same assignee as the present application, and hereby incorporated by reference.

Consider now the operations when the call is from BRI station set 102 to mobile unit 101. Mobile unit 101 is responsive to the call to establish a conference call between BRI station set 102, BRI station set 103, and mobile unit 101. Mobile unit 101 controls this conference but is not joined in the voice portion of the conference. In addition, the name of the user of BRI station set 102 is displayed on mobile unit 101. The user of mobile unit 101 can join this conference at any time by going off hook. Further, all control information interexchanged between BRI station sets 103 and 102 is transferred through mobile unit 101; hence, the user of mobile unit 101 can terminate BRI station set 103 from the call at any time. If voice mail system 104 was providing call coverage, mobile unit 101 interacts in a similar fashion with voice mail system 104 and BRI station set 102. Whether BRI station set 103 or voice mail system 104 is the call coverage terminal, mobile unit 101 still transmits the telephone number and the name of the user of BRI station set 102 to the call coverage terminal.

Figure 2:
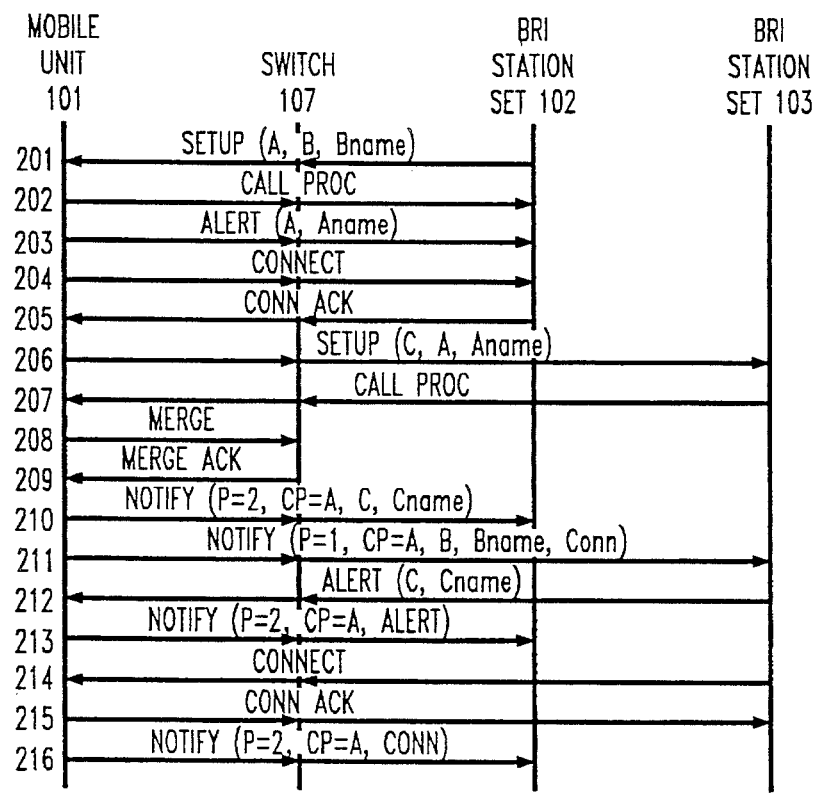
FIG. 2 illustrates the message flow for interconnecting an incoming call from a selected individual to a call coverage system.

FIG. 2 illustrates the message flow utilized to establish send-all-calls conference, when the call is from a selected individual. The set-up message of line 201, that is transmitted from BRI station set 102 to mobile unit 101 via switch 107, specifies to switch 107 and mobile unit 101 that a call is being set up. Lines 202 through 205 complete this call between mobile unit 101 and BRI station set 102. The call is communicated through base station 108 and radio link 112 to mobile unit 101 from switch 107. More details on the functions of base station 108 are given in a later section. Mobile unit 101 is responsive to the name of the user of BRI station set 101 which is contained in the field designated as "BNAME" to display this name on the display of mobile unit 101. Mobile unit 101 gives no audible alerting message.

In order to bring BRI station set 103 into the telephone call for providing call coverage, mobile unit 101 transmits the set-up message of line 206 to BRI station set 103. In response to the call progress message of line 207, mobile unit 101 merges BRI station set 103 into the telephone call by exchanging the messages of lines 208 and 209 with switch 107. Mobile unit 101 then utilizes the notify message of line 210 to inform BRI station set 102 that the call is being transferred to BRI station set 103 for call coverage. In addition, line 211 is utilized to inform BRI station set 103 of the name and telephone number of the calling party. Lines 212 through 216 complete the setting up of the conference call between mobile unit 101, BRI station set 102, and BRI station set 103.

While mobile unit 101 is the transfer point for all control messages between BRI station set 102 and 103, mobile unit 101 is not part of the audio portion of the call. If the user of mobile unit 101 chooses to answer the call, after the call has been established with BRI station set 103, the user of mobile unit 101 simply goes off hook and is immediately placed in the call. If the user of mobile unit 101 wishes to disconnect BRI station set 103, after joining the conference call the user reactivates a disconnect coverage button which causes a disconnect message to sent to switch 107 to disconnect BRI station set 103.

Figure 3:
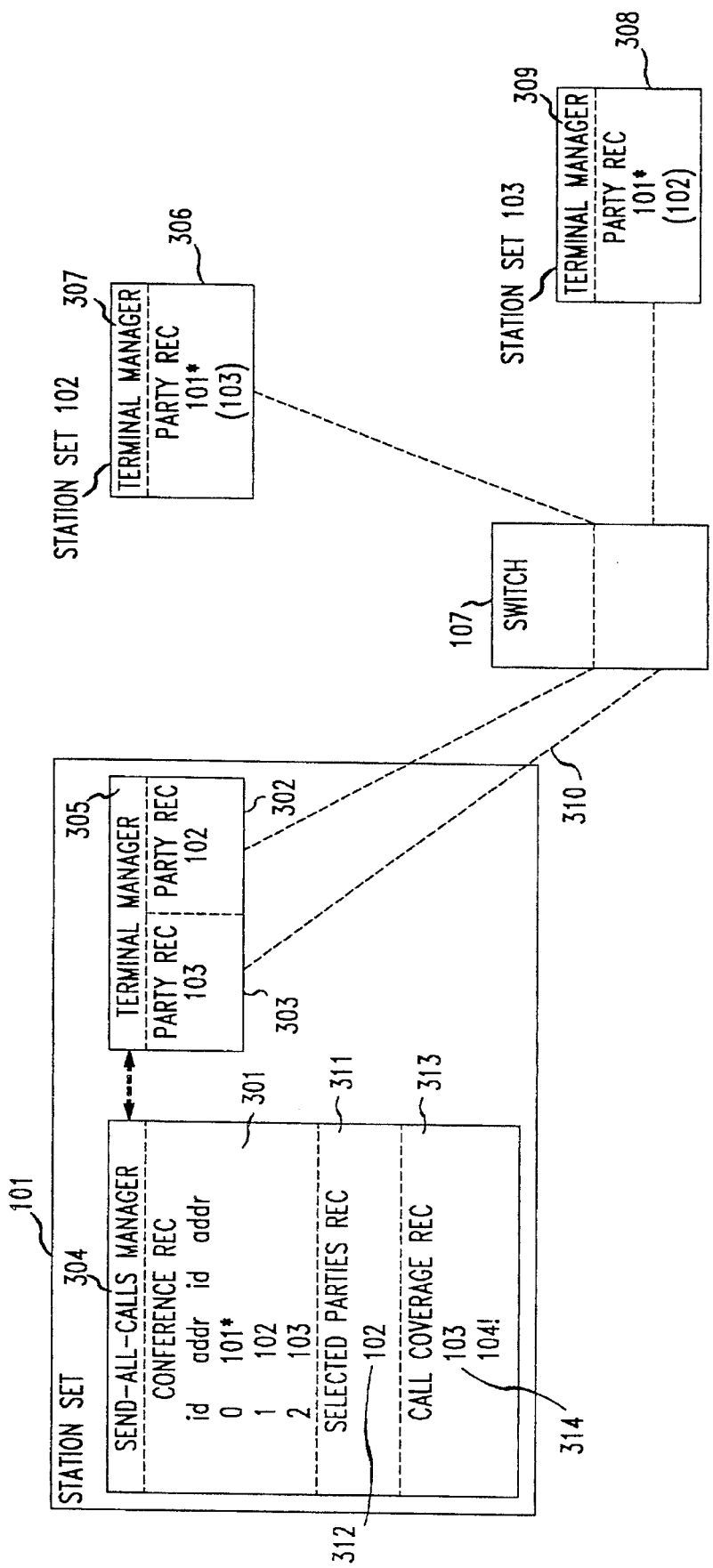
FIG. 3 illustrates the software records that are created during an incoming call from a selected individual.

FIG. 3 illustrates the logical message channels (such as logical channel 310) that are established between the telecommunication terminals via switch 107. These logical channels communicate messages between terminal managers. The manner in which these channels are established is set forth in U.S. Pat. No. 5,159,594 which is hereby incorporated by reference.

FIG. 3 also illustrates the records which are set up in mobile unit 101, BRI station set 102, and BRI station set 103 in response to the messages of FIG. 2. The records and manager applications are located in the highest software layer, the application layer, of the software structure of the terminals. As described in greater detail later, terminal manager application 305 invokes the send-all-calls manager application 304 upon actuation of the send-all-calls button. Each terminal manager application of FIG. 3 maintains a party record for each half of the call in which the terminal manager application is involved. Each party record contains a record of the name and telephone number of the party on the other half of the call. Party records 302 and 303 contain the names and telephone numbers (designated by the entry 102 and 103, respectively) of the users of BRI station sets 102 and 103, respectively. BRI station sets 102 and 103 reflect in their party records (306 and 308, respectively) the telecommunication terminal that is controlling the call. For example, in party record 306, the name and telephone number of mobile unit 101 has an asterisk after them denoting the controlling party. Similarly, the other party (station set 103) on the call is denoted as a subparty by the utilization of parenthesis around the telephone number and name of the subparty.

Send-all-calls manager application 304 utilizes conference record 301 and selected parties record 311. Conference record 301 is utilized to control the conference call that is established between mobile unit 101 and BRI station sets 102 and 103. Selected parties record 311 is utilized to store the names and telephone numbers of the selected individuals whose name will be displayed on mobile unit 101, when the send-all-calls feature has been activated and a selected individual calls. The entries in selected parties records 311 can be entered either by utilizing the keypad of mobile unit 101 or by connecting a personal computer to a connector on mobile unit 101 and utilizing the personal computer to enter the names and telephone numbers into selected parties record 311. Call coverage record 313 maintains the list of call coverage terminals to be used with the send-all-calls feature.

Figure 4:
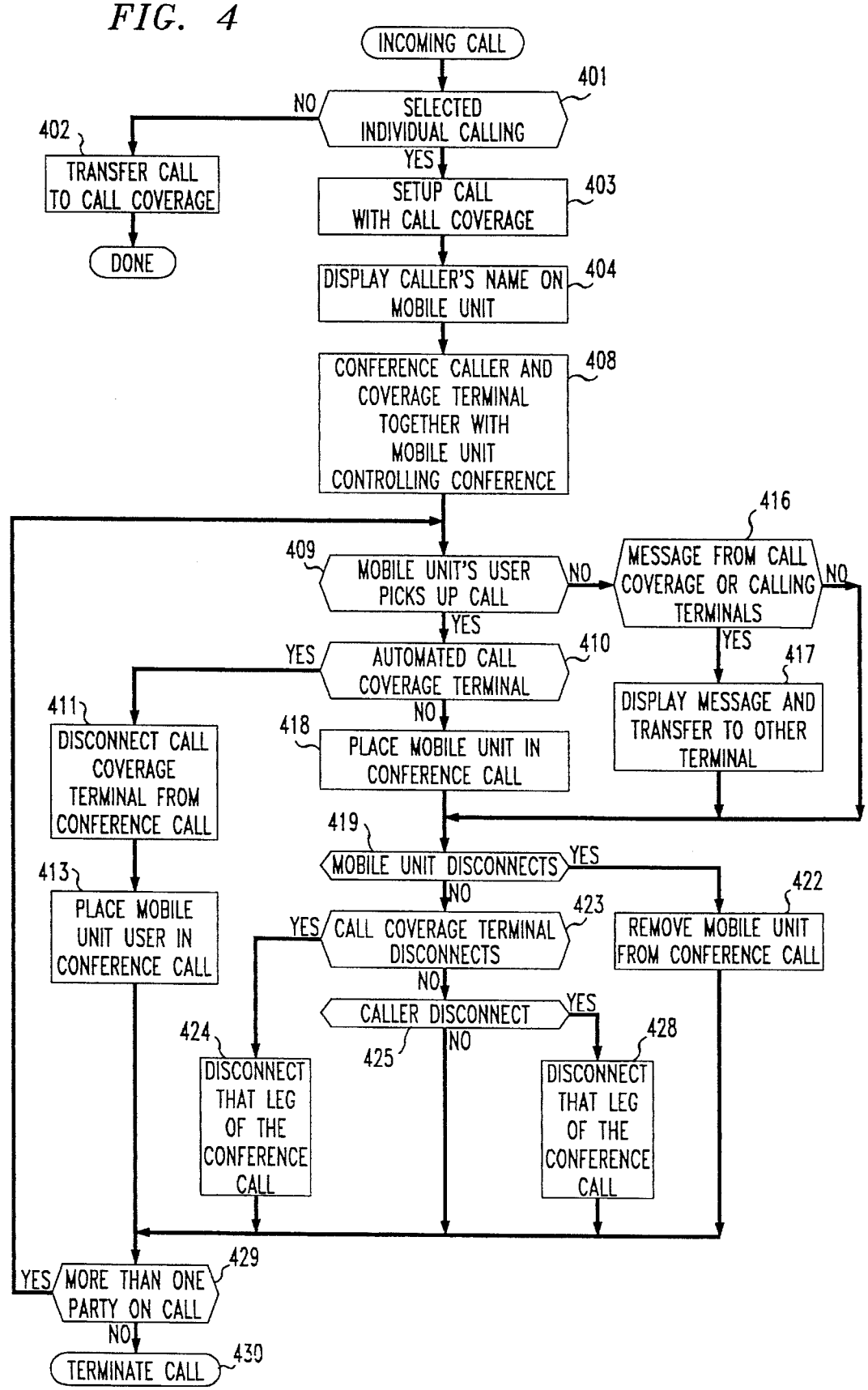
FIG. 4 illustrates, in flowchart form, the functions performed by the controller of the wireless mobile unit.

FIG. 4 illustrates, in flowchart form, the functions performed by send-all-calls manager application 304. Application 304 is responsive to an incoming call to perform decision block 401. Decision block 401 accesses selected parties record 311. If the calling individual is not listed in selected parties record 311, control is transferred to block 402 which redirects the call to BRI station set 103 by utilizing entry 314 of call coverage record 313. If BRI station set 103 is busy, the incoming call is transferred to voice mail system 104 again utilizing call coverage record 313. If the response in decision block 401 is yes, control is transferred to block 403 which sets up a call to the call coverage terminal by using information in call coverage record 313. Block 404 displays the caller's name on the alphanumeric display of the mobile unit. Block 408 then sets up a conference between the caller, the mobile unit, and the coverage terminal with the mobile unit controlling the conference as was illustrated in FIG. 3. At this point in time, the mobile unit is not part of the audio portion of the conference but rather is only processing control messages, since a hold message was used by the mobile unit.

After the conference has been established, decision block 409 determines whether the mobile unit's user has picked up the call. If the answer is no, control is transferred to blocks 416 and 417 which display any messages being received from the two station sets on the conference call and communicate those messages between the station sets on the conference call. If the answer to decision block 409 is yes, control is transferred to decision block 410.

Decision block 410 allows the send-all-calls feature to perform different functions depending on whether the call coverage terminal is an automated system, such as voice mail system 104, or a human operator, such as using BRI station set 103. If it is an automated system, the mobile unit terminates the call to the automated system and allows the user of mobile unit 101 to talk to the calling party. However, if it is a human operator, the mobile unit places all three parties in the conference call. If the answer is yes to decision block 410, control is transferred to block 411 which disconnects the call coverage terminal from the conference call, and block 413 then places the mobile unit user in the audio portion of the conference call using the retrieve message. Returning to decision block 410, if the answer is no, block 418 is executed which places the mobile unit in the audio portion of the conference call and control is transferred to decision block 419.

Blocks 419 through 430 assume that the conference call has been set up and that the mobile unit may or may not be part of that conference call. Decision block 419 checks to see if the mobile unit was part of the conference call and whether the mobile unit has disconnected. If the answer is yes, control is transferred to block 422 which removes the mobile unit from the conference call. After execution of block 422, control is transferred to decision block 429 which determines if there is still more than one party on the call. If there is more than one party on the call, control is transferred to decision block 409. However, if there is not more than one party on the call, control is transferred to block 430 which terminates the call.

Returning to decision block 419, if the answer is no, control is transferred to decision block 422 which checks to see if the call coverage terminal has disconnected. If the call coverage terminal has disconnected, control is transferred to block 424 which terminates that leg of the conference call and control is transferred to decision block 429.

Returning to decision block 423, if the answer is no, control is transferred to decision block 425 which checks to see if the caller has disconnected from the call. If the caller has disconnected from the call, block 428 is executed to disconnect that leg of the conference call and control is then transferred to decision block 429.

Figure 5:
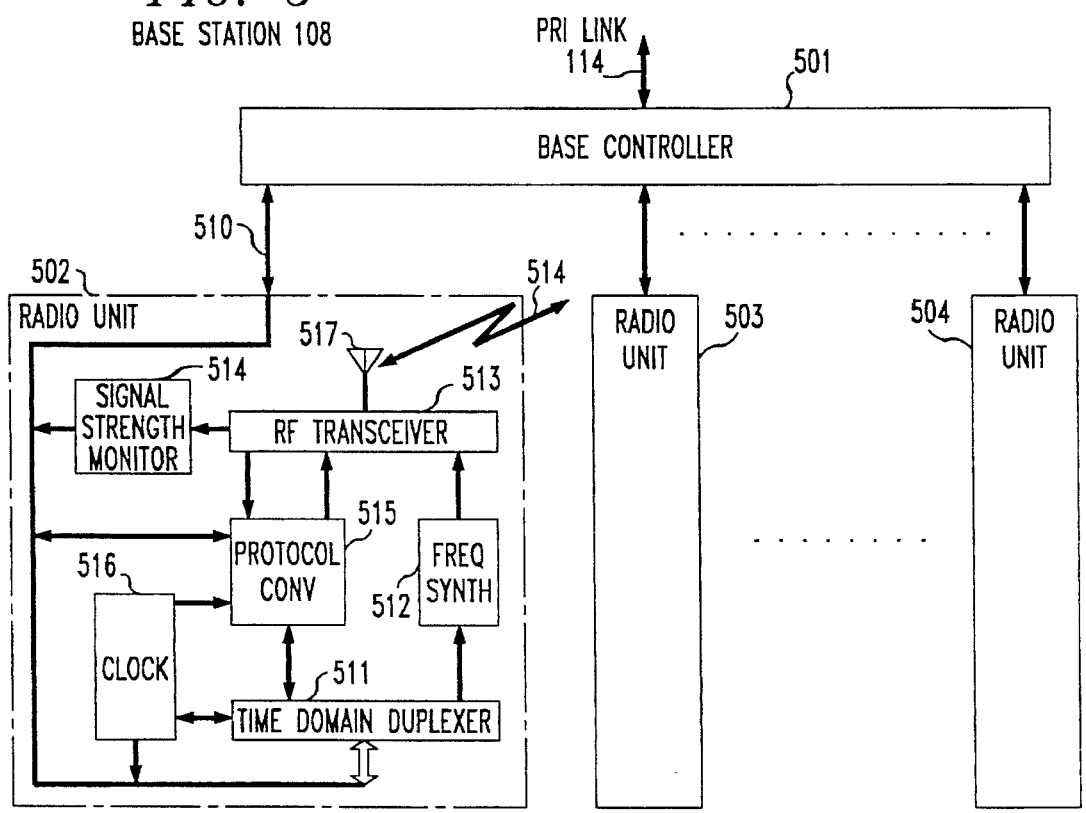
FIG. 5 illustrates a wireless base station.

FIG. 5 illustrates, in greater detail, base station 108. Base controller 501 controls the operations of radio units 502–504. Radio unit 502 is shown in detail, and radio units 503–504 are similar in design. Radio unit 502 includes clock 516 for providing synchronization to Time Domain Demultiplexer (TDD) 511 and protocol converter 515. Radio unit 502 also includes radio frequency (RF) transceiver 513, antenna 517 and frequency synthesizer 512. Transceiver 513 comprises both a RF transmitter and a RF receiver. Transceiver 513 demodulates voice signals and control signals transmitted by a mobile unit and couples the voice signals via protocol converter 515 to base controller 501 via link 510. Base controller 501 provides all control for radio unit 502 via bus 510. Control signals received from transceiver 513 are transferred through protocol converter 515 to base controller 501 via bus 510. Protocol converter 515 is also responsive to digitally encoded voice signals received via bus 510 from base controller 501 to convert those digital voice signals into the format utilized for transmission to a mobile unit. Signal strength monitor 514 is responsive to a signal from RF transceiver 513 to arrive at a digital value representing the signal strength being received by RF transceiver 513 and to transmit this digital value to base controller 501 via bus 510. The manner, in which the transmission of control and data information is accomplished, is set forth in the U.S. Pat. Application of C. Y. Farwell, et al., "Prioritizing a Multiple Access Channel in a Wireless Telephone System", Ser. No. 07/965,504, filed on Oct. 23, 1992, assigned to the same assignee as the present application, and hereby incorporated by reference.

Figure 6:
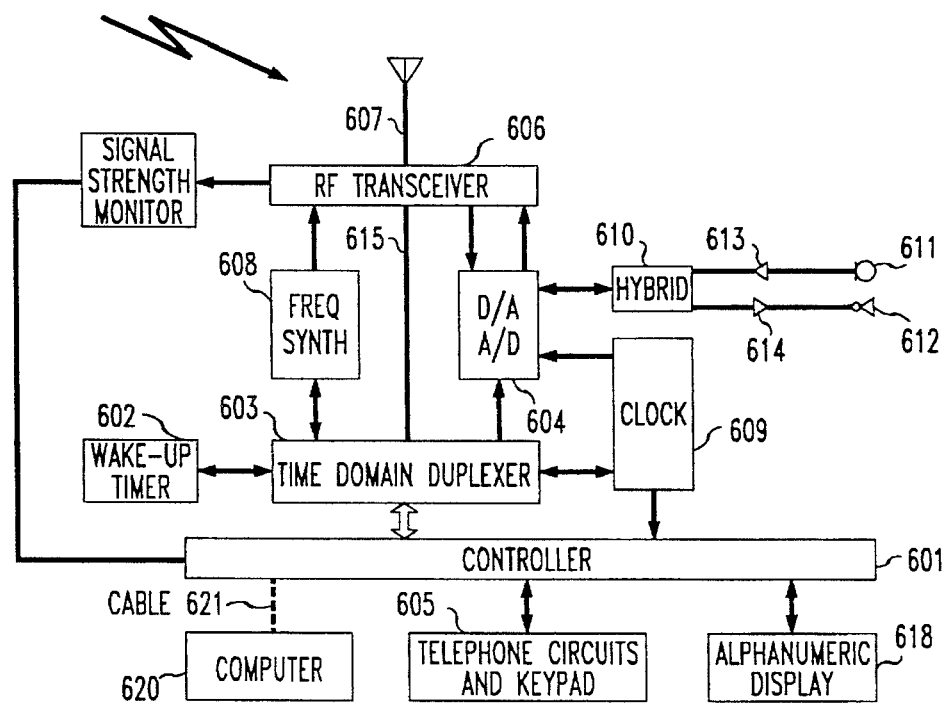
FIG. 6 illustrates a wireless mobile unit.

FIG. 6 illustrates mobile unit 101 in greater detail. Components in this unit include controller 601, wake-up timer 602, and clock 609 for providing synchronization to: (1)controller 601, (2) Time Domain Duplexer (TDD) 603, and (3) combined digital-to-analog and analog-to-digital (D/A+A/D) converter 604. Also included in mobile unit 105 are RF transceiver 606, antenna 607 and frequency synthesizer 608. Telephone circuits and keypad section 605 permits dialing telephone digits and actuating control keys for placing and receiving telephone calls.

Transceiver 606 comprises both an RF transmitter and an RF receiver. Alphanumeric display 618 allows the display of telephone numbers and names. Transceiver 606 demodulates voice signals transmitted by a base station and couples these signals via the D/A section of converter 604 and hybrid 610 on to loudspeaker 612. Transceiver 606 receives its input analog speech signals from microphone 611. These analog speech signals are coupled to the transceiver via hybrid 610 and the A/D section of converter 604. Converter 604 converts the analog signals to a digital signals which are then transmitted to RF transceiver 606. Conventional amplifiers 613 and 614 are employed for amplifying the analog speech signals obtained from microphone 611 and provided to loudspeaker 612. The manner, in which transmission of control and data information is accomplished for mobile unit 101, is set forth in the U.S. Patent Application of C. Y. Farwell, et al., "Prioritizing a Multiple Access Channel in a Wireless Telephone System", Ser. No. 07/965,504, filed on Oct. 23, 1992, assigned to the same assignee as the present application, and is incorporated hereby by reference.

As illustrated in FIG. 6, a computer such as computer 620 can be attached by table 621 to controller 601 to enter the names and telephone numbers of the selected individuals using techniques which are well known in the art.

I claim:

1. A called telephone terminal for providing a send-all-call operation and the called telephone terminal for connection to a telecommunication switching system, the called telephone terminal comprising:

means for receiving a call setup message from the telecommunication switching system indicating that a call is being established from a calling telecommunication terminal and the call setup message having caller identification information identifying the calling telecommunication terminal;

means for establishing a call connection between the calling telecommunication set and a call coverage terminal through the telecommunication switching system with the call connection being controlled by the called telephone terminal which is a hand-held wireless mobile telephone unit if the caller identification information is found in a table defining selected individuals;

means for transferring the call to the call coverage terminal via the telecommunication switching system if the caller identification information is not found in the table defining selected individuals; and the establishing means comprises means for receiving call control messages from the calling telephone terminal and relaying the call control message from the calling telephone terminal to the call coverage terminal via the telecommunication switching system and receiving call control messages from the call coverage terminal and relaying the call control messages from the call coverage terminal to the calling telephone terminal via the telecommunication switching system for the duration of the call.

2. The called telephone terminal of claim 1 wherein the establishing means comprises means for detecting call origination by an user of the called telephone terminal; and means for connecting the calling telecommunication terminal, the called telephone terminal, and the call coverage terminal in a conference call via the telecommunication switching system if the call coverage terminal is of a first type of call coverage terminal.

3. The called telephone terminal of claim 2 wherein the establishing means comprises means for detecting call origination by the user of the called telephone terminal; and means for connecting the calling telecommunication terminal and the called telephone terminal on the call via the telecommunication switching system and disconnecting the call coverage terminal if the call coverage terminal is of a second type of call coverage terminal.

4. The called telephone terminal of claim 3 wherein the establishing means comprises means for displaying the caller identification information.

5. The called telephone terminal of claim 4 further comprises a key pad; and means responsive to information defining the selected individuals received via the key pad for entering the selected individuals information into the table.

6. The called telephone terminal of claim 5 further comprises means for interfacing a computer to the called telephone terminal; and means responsive to information defining the selected individuals received from the computer via the interfacing means for entering the selected individuals information into the table.

7. A method for providing a send-all-call operation by a called telephone terminal and the called telephone terminal for connection to a telecommunication switching system, the method comprising:

receiving a call setup message from the telecommunication switching system indicating that a call is being established from a calling telecommunication terminal and the call setup message having caller identification information identifying the calling telecommunication terminal;

establishing a call connection between the calling telecommunication set and a call coverage terminal through the telecommunication switching system with the call connection being controlled by the called telephone terminal which is a hand-held wireless mobile telephone unit if the caller identification information is found in a table defining selected individuals;

transferring the call to the call coverage terminal via the telecommunication switching system if the caller identification information is not found in the table defining selected individuals; and the establishing step comprises the steps of receiving call control messages from the calling telephone terminal and relaying the call control messages from the calling telephone terminal to the call coverage terminal via the telecommunication switching system and receiving call control messages from the call coverage terminal and relaying the call control messages from the call coverage terminal to the calling telephone terminal via the telecommunication switching system for the duration of the call.

8. The method of claim 7 wherein the establishing step comprises the steps of detecting call origination by an user of the called telephone terminal; and connecting the calling telecommunication terminal, the called telephone terminal, and the call coverage terminal in a conference call via the telecommunication switching system if the call coverage terminal is of a first type of call coverage terminal.

9. The method of claim 8 wherein the establishing step comprises the steps of detecting call origination by the user of the called telephone terminal; and connecting the calling telecommunication terminal and the called telephone terminal on the call via the telecommunication switching system and disconnecting the call coverage terminal if the call coverage terminal is of a second type of call coverage terminal.

10. The method of claim 9 wherein the establishing step further comprises the step of displaying the caller identification information.

11. The method of claim 10 wherein the called telephone terminal comprises a key pad and the method further comprises the step of entering the selected individuals information into the table in response to information defining the selected individuals received via the key pad.

12. The method of claim 11 further comprises the steps of interfacing a computer to the called telephone terminal; and entering the selected individuals information into the table in response to information defining the selected individuals received from the computer via the interfacing step.

* * * * *